(12) United States Patent
Qi et al.

(10) Patent No.: US 11,468,378 B2
(45) Date of Patent: Oct. 11, 2022

(54) METHOD AND APPARATUS FOR SKILL SHARING

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventors: Yaowen Qi, Beijing (CN); Quan Liang, Beijing (CN); Liangcheng Wu, Beijing (CN); Huan Tang, Beijing (CN)

(73) Assignees: BAIDU ONLINE NETWORK TECHNOLOGY (BEIJING) CO., LTD.; SHANGHAI XIAODU TECHNOLOGY CO. LTD.

( * ) Notice: Subject to any disclaimer, the term of this patent is extended or adjusted under 35 U.S.C. 154(b) by 387 days.

(21) Appl. No.: 16/667,966

(22) Filed: Oct. 30, 2019

(65) Prior Publication Data
US 2020/0242537 A1    Jul. 30, 2020

(30) Foreign Application Priority Data

Jan. 29, 2019    (CN) .......................... 201910086434.0

(51) Int. Cl.
*G06F 3/0481*    (2022.01)
*G06Q 10/06*    (2012.01)
*G06Q 50/20*    (2012.01)

(52) U.S. Cl.
CPC ... *G06Q 10/063112* (2013.01); *G06F 3/0481* (2013.01); *G06Q 50/2057* (2013.01)

(58) Field of Classification Search
CPC .......... G06N 5/022; G06Q 10/063112; G06Q 50/2057; G06F 3/0481
See application file for complete search history.

(56) References Cited

U.S. PATENT DOCUMENTS 10,015,271 B1 *   7/2018   Chang ................... G06F 16/176
2005/0044145 A1   2/2005   Quinn et al.
(Continued)

FOREIGN PATENT DOCUMENTS

CN    105931107 A    9/2016
CN    107590718 A    1/2018
(Continued)

OTHER PUBLICATIONS

Saleh M. Alsaleem et al., Analysis and Evaluation of Web-Based Testing Tools, Oct. 1, 2015, IEEE Xplore, pp. 1-6 (Year: 2015).*
(Continued)

*Primary Examiner* — Tam T Tran
(74) *Attorney, Agent, or Firm* — Dilworth IP, LLC

(57) ABSTRACT

The present disclosure provides a method and apparatus for skill sharing. A user's first click operation on a sharing link of a first skill is received; and the page jumps to a skill development page according to the first click operation, where the skill development page includes an input box of a link and an import button, and the input box is used to input a sharing link of a skill, while the import button is used to input an import instruction of the skill; and the first skill is imported into a skill development platform according to a user operation. By generating a sharing link of the skill, the sharing link of the skill can be shared within any location in existing sharing ways. The sharing manner thus enables the user to import the first skill in a variety of ways and avoids repeated development from different developers.

19 Claims, 7 Drawing Sheets

(56) References Cited

U.S. PATENT DOCUMENTS

| | | | | |
|---|---|---|---|---|
| 2005/0177573 A1* | 8/2005 | Gauthier | ............... | G06F 16/951 |
| 2010/0274912 A1* | 10/2010 | Barnfield | .............. | H04L 67/306 |
| | | | | 709/229 |
| 2018/0293603 A1* | 10/2018 | Glazier | ................... | H04L 67/22 |
| 2019/0220938 A1* | 7/2019 | Sukman | .................. | G06F 40/30 |

FOREIGN PATENT DOCUMENTS

| | | |
|---|---|---|
| CN | 108564946 A | 9/2018 |
| JP | 2007101291 A | 4/2007 |
| JP | 2008225696 A | 9/2008 |
| JP | 2013020519 A | 1/2013 |

OTHER PUBLICATIONS

Khaisar Muneebulla Khan et al., Open Source Software for Personal Information Managers and Personal Knowledge Management, Nov. 1, 2009, IEEE Xplore, pp. 1-5 (Year: 2009).*

Add GitHub jump link for blog Garden, https://blog.csdn.net/xingoo_/article/details/86143430, Sep. 28, 2017, p. 1.

Second Office Action in CN Patent Application No. 201910086434.0 dated Feb. 3, 2021.

First Office Action in JP Patent Application No. 2019200535 dated Dec. 22, 2020.

Get started quickly on the github website and I earn about the basic language, https;//jingyan.baidu.com/article/fea4511ad75f85f7bb9125d8.html, 2020, pp. 1-6.

First office action issued in CN Patent Application No. 201910086434.0 dated Jun. 16, 2020.

* cited by examiner

METHOD AND APPARATUS FOR SKILL SHARING

CROSS-REFERENCE TO RELATED APPLICATION

This application claims priority to Chinese Patent Application No. 201910086434.0, filed on Jan. 29, 2019, which is hereby incorporated by reference in its entirety.

TECHNICAL FIELD

The present disclosure relates to the field of smart device technologies, and in particular to a method and apparatus for skill sharing.

BACKGROUND

With the rapid development of network technology of smart terminals, more and more people use voice interactive applications, e.g., the smart speaker to query weather, traffic, music and news in daily life, each application including one or more skills.

Currently, the skills can be developed through some conversational artificial intelligence open platforms, such as Baidu's DuerOS and Amazon's Alexa. Due to openness of open platform, anyone can use the open platform to develop skills and share their developed skills on a public platform, so that terminal users or other developers can select the skills they need from the public platform.

However, in the prior art, the skill sharing manner is single and inflexible.

SUMMARY

The present disclosure provides a method and apparatus for skill sharing, which makes the skill sharing manner more diversified and flexible.

A first aspect of the present disclosure provides a method for skill sharing, including:

receiving a user's first click operation on a sharing link of a first skill;

jumping to a skill development page according to the first click operation, where the skill development page includes an input box of a link and an import button, and the input box is used to input a sharing link of a skill, while the import button is used to input an import instruction of the skill; and importing the first skill into a skill development platform according to a user operation.

Optionally, the importing the first skill into the skill development platform according to a user operation includes:

automatically pasting the sharing link of the first skill to the input box;

receiving the user's second click operation on the import button; and importing the first skill into the skill development platform according to the second click operation.

Optionally, the importing the first skill into the skill development platform according to a user operation includes:

pasting the sharing link of the first skill into the input box according to a paste operation input by the user;

alternatively, receiving the sharing link of the first skill which is input by the user through a input component;

receiving the user's second click operation on the import button; and importing the first skill into the skill development platform according to the second click operation.

Optionally, after the importing the first skill into the skill development platform, the method further includes:

opening a resource management page according to a user operation, where the resource management page includes an intent, a dictionary and codes of the first skill.

Optionally, the method further includes:

receiving the user's editing operation on one or more of the intention, the dictionary, and the codes of the first skill; and generating an updated version of the first skill according to the editing operation.

Optionally, after the version of the first skill is updated, when it comes to the next sharing, a sharing link of the updated version of the first skill needs to be regenerated, where the sharing links for different versions of the first skill are different.

Optionally, before receiving a user's first click operation on a sharing link of a first skill, the method further includes:

receiving the sharing link of the first skill sent by another user through instant messaging software.

Optionally, the sharing link of the first skill is shared within a webpage, a mail or a file.

Optionally, the method further includes:

opening a management subpage of a second skill according to the user's operation on a created entry to the second skill in the skill development page, where the management subpage includes an identity and a share button of the second skill;

receiving the user's third click operation on the share button;

generating a sharing link of the second skill according to the third click operation; and copying the sharing link of the second skill according to a user operation.

Optionally, the generating a sharing link of the second skill according to the third click operation includes:

generating a dialog box according to the third click operation, where the dialog box includes the sharing link of the second skill, and the dialog box further includes a copy button; and the copying the sharing link of the second skill according to a user operation includes:

receiving the user's fourth click operation on the copy button; and copying the sharing link of the second skill according to the fourth click operation.

Optionally, the dialog box further includes first prompt information, where the first prompt information is used to indicate a maximum number of times the second skill can be shared within a preset time.

Optionally, before the opening a management subpage of a second skill, the method further includes:

determining whether a number of times the second skill is shared is greater than the maximum number of times;

if the number of times the second skill is shared is not greater than the maximum number of times, generating the sharing link of the second skill; and if the number of times the second skill is shared is greater than the maximum number of times, setting the share button to be invalid, and displaying second prompt information, where the second prompt information is used to indicate that the number of times the second skill is shared has reached the maximum number of times.

Optionally, after the version of the second skill is updated, when it comes to the next sharing, a sharing link of the updated version of the second skill needs to be regenerated, where the sharing links for different versions of the second skill are different.

A second aspect of the present disclosure provides an apparatus for sharing skill, including:

a receiving module, configured to receive a user's first click operation on a sharing link of a first skill;

a jumping module, configured to jump to a skill development page according to the first click operation, where the skill development page includes an input box of a link and an import button, and the input box is used to input a sharing link of a skill, and the import button is used to input an import instruction of the skill; and an importing module, configured to import the first skill into a skill development platform according to a user operation.

Optionally, the importing module is specifically configured to:

automatically paste the sharing link of the first skill to the input box;

receive the user's second click operation on the import button; and import the first skill into the skill development platform according to the second click operation.

Optionally, the importing module is specifically configured to:

paste the sharing link of the first skill into the input box according to a paste operation input by the user;

alternatively, receive the sharing link of the first skill which is input by the user through a input component;

receive the user's second click operation on the import button; and import the first skill into the skill development platform according to the second click operation.

Optionally, the apparatus further includes:

a first opening module, configured to open a resource management page according to a user operation, where the resource management page includes an intent, a dictionary and codes of the first skill;

Optionally, the apparatus further includes an updating module;

the receiving module is further configured to receive the user's editing operation on one or more of the intention, the dictionary, and the codes of the first skill; and the updating module is configured to generate an updated version of the first skill according to the editing operation.

Optionally, after the version of the first skill is updated, when it comes to the next sharing, a sharing link of the updated version of the first skill needs to be regenerated, where the sharing links for different versions of the first skill are different.

Optionally, the receiving module is further configured to:

receive the sharing link of the first skill sent by another user through instant messaging software.

Optionally, the sharing link of the first skill is shared within a webpage, a mail or a file.

Optionally, the apparatus further includes:

a second opening module, configured to open a management subpage of a second skill according to the user's operation on a created entry to the second skill in the skill development page, where the management subpage includes an identity and a share button of the second skill;

the receiving module is further configured to receive the user's third click operation on the share button;

a generating module, configured to generate a sharing link of the second skill according to the third click operation; and a copying module, configured to copy the sharing link of the second skill according to a user operation.

Optionally, the generating module is specifically configured to:

generate a dialog box according to the third click operation, where the dialog box includes the sharing link of the second skill, and the dialog box further includes a copy button; and the copying module is specifically configured to:

receive the user's fourth click operation on the copy button; and copy the sharing link of the second skill according to the fourth click operation.

Optionally, the dialog box further includes first prompt information, where the first prompt information is used to indicate a maximum number of times the second skill can be shared within a preset time.

Optionally, the apparatus further includes:

a determining module, configured to determine whether a number of times the second skill is shared is greater than the maximum number of times;

the generating module is specifically configured to: generate the sharing link of the second skill if the number of times the second skill is shared is not greater than the maximum number of times; and set the share button to be invalid and display second prompt information if the number of times the second skill is shared is greater than the maximum number of times, where the second prompt information is used to indicate that the number of times the second skill is shared has reached the maximum number of times.

Optionally, after the version of the second skill is updated, when it comes to the next sharing, a sharing link of the updated version of the second skill needs to be regenerated, where the sharing links for different versions of the second skill are different.

A third aspect of the present disclosure provides a terminal device including a processor, a memory, and a transceiver, where the memory is configured to store instructions; the transceiver is configured to communicate with other devices; and the processor is configured to execute instructions stored in the memory to cause the terminal device to perform the method according to the first aspect of the present disclosure and each optional implementation of the first aspect.

A fourth aspect of the present disclosure provides a computer readable storage medium, where the computer readable storage medium stores instructions which, when executed, cause a computer to perform the method as described in the first aspect of the disclosure and each optional implementation of the first aspect.

In the method and apparatus for skill sharing provided by the present disclosure, a user's first click operation on a sharing link of a first skill is received; and the page jumps to a skill development page according to the first click operation, where the skill development page includes an input box of a link and an import button, and the input box is used to input a sharing link of a skill, while the import button is used to input an import instruction of the skill; and the first skill is imported into the skill development platform according to a user operation. By generating a sharing link of the skill, the sharing link of the skill can be shared within any location in existing sharing ways. With more diversity and flexibility, the sharing manner thus enables the user to import the first skill in a variety of ways, facilitates the promotion of the skill and avoids repeated development from different developers.

BRIEF DESCRIPTION OF THE DRAWINGS

The drawings herein are incorporated in the specification and constitute a part of the specification, which show embodiments consistent with the disclosure and are used together with the specification to explain the principles of the present disclosure.

Clear embodiments of the present disclosure are shown through the above drawings, which will be described in more detail later. The drawings and the literal description are not intended to limit the scope of the inventive concept in any way, but to explain the concept of the disclosure for those skilled in the art with reference to the specific embodiments.

DETAILED DESCRIPTION OF THE EMBODIMENTS

In order to make the purpose, technical solution and advantages of the embodiments of the present disclosure clearer, the technical solutions in the embodiments of the present disclosure are clearly and completely described as follows with reference to the accompanying drawings in the embodiments of the present disclosure, obviously, the described embodiments are a part rather than all of the embodiments of the present disclosure. According to the embodiments in the present disclosure, all other embodiments obtained by those skilled in the art without creative efforts are within the scope of the present disclosure.

Figure 1:
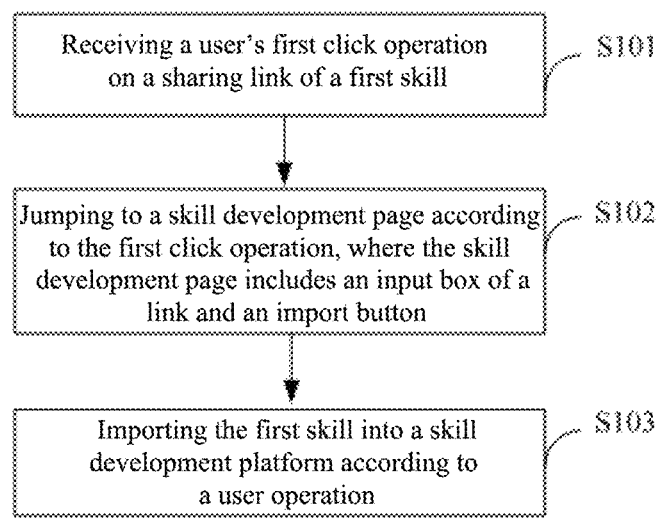
FIG. 1 is a flowchart of a method for skill sharing provided by Embodiment 1 of the present disclosure.

FIG. 1 is a flowchart of a method for skill sharing provided by Embodiment 1 of the present disclosure. The method of this embodiment can be applied to a terminal device capable of running on a skill development platform, and the terminal device can be a personal computer, a tablet computer, a smart phone, or the like. As shown in FIG. 1, the method provided in this embodiment includes following steps:

Step S101, receiving a user's first click operation on a sharing link of a first skill.

The sharing link of the first skill is also referred to as a website or Uniform Resource Locator (URL), and the first skill was developed by other developers.

A complete skill consists of three parts: intent, dictionary, and codes, where the skill can be used only if the intent, the dictionary, and the codes of the skill are completely copied into the skill development platform.

The intent of the skill is used to describe the purpose of the skill, which includes intent information, common expressions, and a slot list. The intent information may include a Chinese name and identity name of the intent. For example, if the purpose of the skill is inquiry, then the Chinese name of the intent is "chaxun", and the identity name of the intent is "inquiry"; the common expression of the intent defines some common statements that describe the intent.

The dictionary refers to a range to which a corresponding slot belongs when a user configures a common expression, and the range represents a certain field or a certain type of vocabulary collection.

In this embodiment, the sharing link of the first skill represents the address of the resource of the first skill, and the resource of the first skill includes the intent, the dictionary and the codes of the first skill. The resource of the first skill can be queried and found from the database through the sharing link of the first skill.

The sharing link of the first skill may be sent by other users through instant messaging software. For example, after user A develops the first skill, a sharing link of the first skill is generated, and the sharing link of the first skill is sent to user B through the instant messaging software, so that user B can import the first skill into the skill development platform.

The sharing link of the first skill may also be shared via a webpage, a mail or a file. After the user develops the first skill, a sharing link of the first skill is generated, and the sharing link of the first skill is copied to the webpage, the mail, the file, or the like.

For example, user A shares the sharing link of the first skill within the network question and answer community, so that other users of the community can understand the first skill or import the first skill, paste the sharing link of the first skill in the mail and send it to the mail recipient.

Step S102, jumping to a skill development page according to the first click operation, where the skill development page includes an input box of a link and an import button.

After the user clicks the sharing link of the first skill, the page jumps to the skill development page, where the skill development page includes a input box of a link and an import button, and the input box is used to input a sharing link of a skill, while the import button is used to input an import instruction of the skill.

Figure 2:
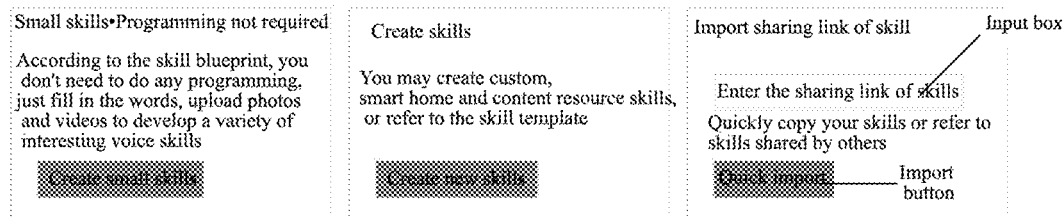
FIG. 2 is a schematic diagram of the skill development page.

FIG. 2 is a schematic diagram of the skill development page. As shown in FIG. 2, the skill development page includes an option for importing a sharing link of the skill, and the option includes an input box and an import button. Optionally, the input box displays the prompt message "Enter Sharing Link of Skill". Optionally, the outside of the input box also displays a description message "Quickly copy your skills or refer to skills shared by others" which is used to describe the options for the sharing links of the imported skills. It can be understood that these prompt information can be changed as long as the user can describe or prompt the above functions.

Optionally, after the sharing link of the skill is input in the input box, the import button begins to blink to attract or prompt the user to click the import button to complete the import of the skill.

As shown in FIG. 2, the skill development page further includes following options: option of small skills, option of create skills, and option of all my skills. The option of small skills is used to create small skills; the option of create skills is used to create new skills; and the option of all my skills option includes all the skills that the user has created and imported.

FIG. 2 is only for illustration, and other options may be included in the skill development page, which is not limited in this embodiment.

Step S103, importing the first skill into a skill development platform according to a user operation.

The first skill can be imported into the skill development platform in the following three manners:

In a first manner, the sharing link of the first skill is automatically pasted into the input box, and the user's second click operation on the import button is received, and the first skill is imported into the skill development platform according to the second click operation.

In this manner, after the page jumps to the skill development page, the sharing link of the first skill is automatically pasted into the input box, such that the user only needs to click the sharing link of the first skill to realize the two-step operation of page jump and automatic paste.

In a second manner, the sharing link of the first skill is pasted into the input box according to a paste operation input by the user, and the user's second click operation on the import button is received, and the first skill is imported into the skill development platform according to the second click operation.

The user first manually copies the sharing link of the first skill, and then pastes the sharing link of the first skill into the input box.

In a third manner, the sharing link of the first skill which is input by the user through an input component is received, and user's second click operation on the import button is received, and the first skill is imported into the skill development platform according to the second click operation.

In this manner, the user inputs a sharing link of the first skill into the input box through a physical keyboard or a virtual keyboard.

After the user clicks the import button, the skill development platform queries and finds the address of the resource of the first skill from the database according to the sharing link of the first skill, and copies the intent information, the dictionary information and the codes of the first skill to the skill development platform, thereby completing the import of the first skill.

Optionally, after the first skill is imported into the skill development platform, the page jumps to the resource management page according to the second click operation, where the resource management page includes the intent information, the dictionary information, and the codes of the first skill.

In the present embodiment, the user's first click operation on the sharing link of a first skill is received; the page then jumps to a skill development page according to the first click operation, where the skill development page includes a input box of the link and an import button, and the input box is used to input a sharing link of a skill, while the import button is used to input an import instruction of the skill; a first skill is imported into a skill development platform according to a user operation. By generating a sharing link of the first skill, the skills' sharing link can be shared within any location in existing sharing ways. With more diversity and flexibility, the sharing manner thus enables the user to import the first skill in a variety of ways, facilitates the promotion of the first skill and avoids repeated development from different developers.

Figure 3:
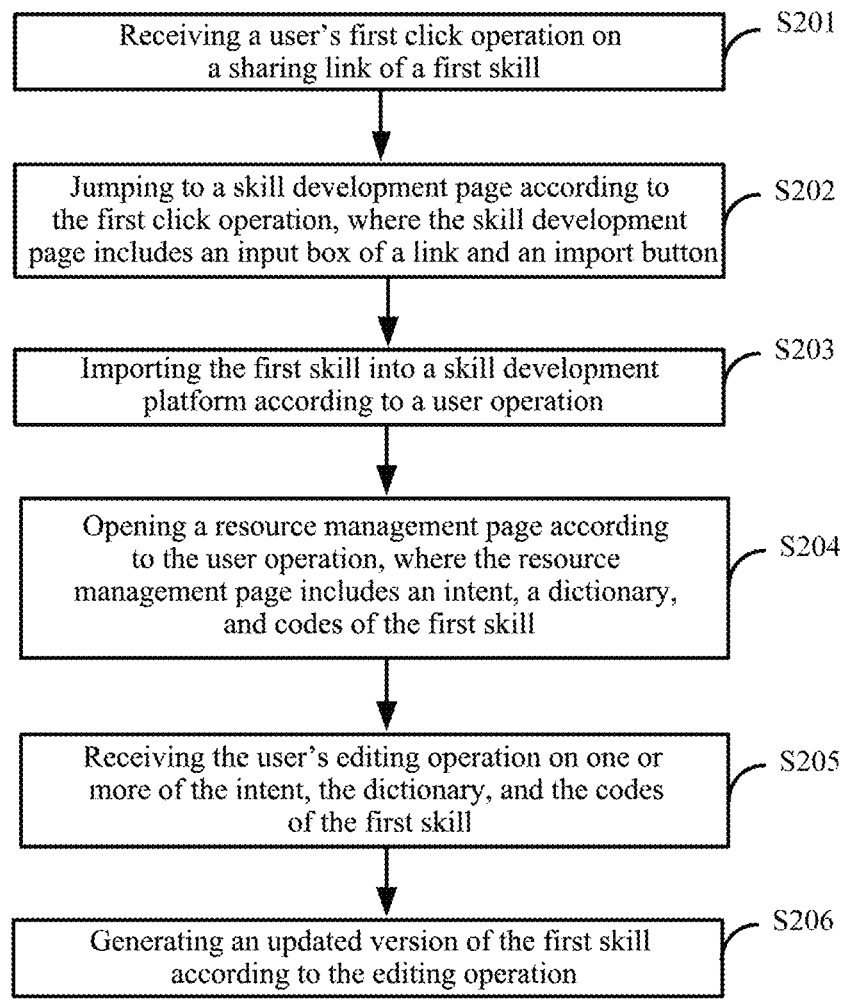
FIG. 3 is a flowchart of a method for skill sharing provided by Embodiment 2 of the present disclosure.

FIG. 3 is a flowchart of a method for skill sharing provided by Embodiment 2 of the present disclosure. As shown in FIG. 3, the method provided in this embodiment includes following steps:

Step S201, receiving a user's first click operation on a sharing link of a first skill.

Step S202, jumping to a skill development page according to the first click operation, where the skill development page includes an input box of a link and an import button.

Step S203, importing the first skill into a skill development platform according to a user operation.

For a specific implementation of Steps S201-S203, reference can be made to the related description of Embodiment 1, and details are not described herein again.

Step S204, opening a resource management page according to the user operation, where the resource management page includes an intent, a dictionary, and codes of the first skill.

In the present embodiment, after the first skill is imported into the skill development platform, the user can open the resource management page to view the intent, the dictionary and the codes of the first skill, so that the user can perform learning or other operations.

Step S205, receiving the user's editing operation on one or more of the intent, the dictionary, and the codes of the first skill.

The user may add or delete common expressions in the intent, or modify the intent slot; the user may further modify the value of the dictionary, or modify the codes.

Step S206, generating an updated version of the first skill according to the editing operation.

After completing the editing, the user clicks a submit button to generate the updated version of the first skill.

After the version of the first skill is updated, when it comes to the next sharing, a sharing link of the updated version of the first skill needs to be regenerated, where the sharing links of different versions of the first skill are different. For example, after a skill in A state is clicked for sharing, the sharing link can only invoke the A state. If the skill is subsequently updated to B state and needs to be clicked for sharing again, the B link can be invoked only with the new link, that is, the previous sharing link does not update its content in consistency with the update of the skill.

In the present embodiment, after the first skill is imported into the skill development platform, a resource management page is opened according to the user operation, where the resource management page includes the intent, the dictionary, and the codes of the first skill; the user's editing operation on one or more of the intent, the dictionary, and the codes of the first skill are received, and the updated version of the first skill is generated according to the editing operation. After the first skill is imported, the intent, the dictionary and the codes of the first skill can be viewed, then the intent, the dictionary and the codes of the first skill are edited, thus the first skill is updated. Therefore a developer is enabled to reuse the intent, the dictionary and the codes of the skills developed by other developers, which saves the cost and time of skill development and improves the efficiency of skill development.

Figure 4:
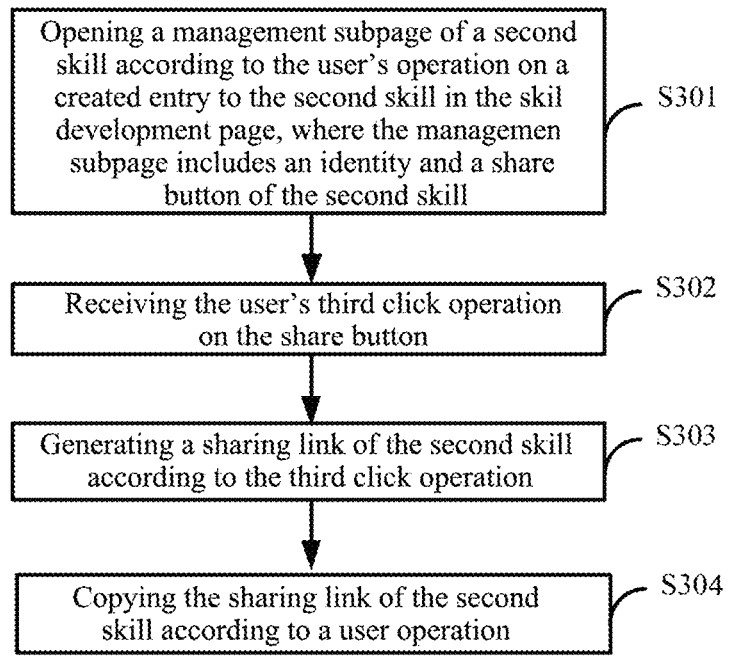
FIG. 4 is a flowchart of a method for skill sharing provided by Embodiment 3 of the present disclosure.

FIG. 4 is a flowchart of a method for skill sharing according to Embodiment 3 of the present disclosure. The method in the present embodiment may be performed independently, or may be performed on the basis of Embodiment 1 or Embodiment 2. The method of the Embodiment 1 is to import external skills into the skill development platform, while the present embodiment is to export the skills developed by the skill development platform. As shown in FIG. 4, the method provided in the present embodiment includes following steps:

Step S301, opening a management subpage of a second skill according to the user's operation on a created entry to the second skill in the skill development page, where the management subpage includes an identity and a share button of the second skill.

The second skill does not specifically refer to a certain skill, and merely serves as a skill distinguished from the first skill.

In the present embodiment, the skill development page includes an entry of the completed second skill, and the user can open the management subpage of the second skill by clicking the entry of the second skill. The management subpage includes an identity (ID) and a share button of the second skill. Optionally, the management subpage further includes a delete button and an edit button.

The entry of the skill may be the each skill name or the icon above the each skill name in FIG. 2, and the user clicks the skill name or the icon to open the management subpage of the skill.

Figure 5:
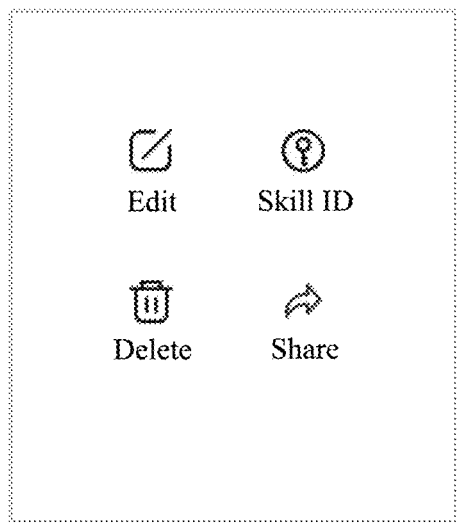
FIG. 5 is a schematic diagram of a skill management subpage.

FIG. 5 is a schematic diagram of a skill management subpage. As shown in FIG. 5, the management subpage includes: an edit button, a skill ID, a delete button, and a share button. After clicking the edit button, the user enters the edit page to edit the skill, and the user clicks the share button to share the skill, and the user clicks the delete button to delete the skill.

Step S302, receiving the user's third click operation on the share button.

Step S303, generating a sharing link of the second skill according to the third click operation.

In an exemplary manner, a dialog box is generated according to the third click operation, where the dialog box includes the sharing link of the second skill.

Step S304, copying the sharing link of the second skill according to a user operation.

Optionally, the dialog box further includes a copy button. The user's fourth click operation on the copy button is received, and the sharing link of the second skill is copied according to the fourth click operation.

When the copy button is not included in the dialog box, the user can manually select the sharing link of the second skill, and then copy the sharing link of the second skill.

Optionally, the dialog box further includes first prompt information, where the first prompt information is used to indicate a maximum number of times the second skill can be shared within a preset time. The preset time is, for example, one day, an hour, or a certain period of time.

Figure 6:
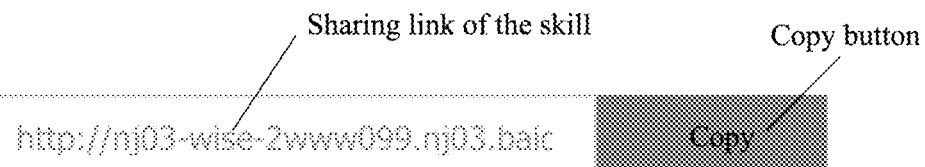
FIG. 6 is a schematic diagram of a dialog box.

FIG. 6 is a schematic diagram of a dialog box. As shown in FIG. 6, the dialog box includes a sharing link of the skill and a copy button, and the bottommost text of the dialog box is the first prompt information.

The purpose of setting the maximum number of times is to prevent an illegal user from maliciously invoking the interface to occupy the server memory, where statistics will be performed for each sharing on the server side, and the server is a server where the skill development platform is deployed.

Correspondingly, before opening the management subpage of the second skill, it is determined whether a number of times the second skill is shared is greater than the maximum number of times, and if the number of times the second skill is shared is not greater than the maximum number of times, the sharing link of the second skill is generated, and if the number of times the second skill is shared is greater than the maximum number, the share button is set to be invalid, and a second prompt information is displayed, where the second prompt information is used to indicate that the number of times the second skill has been shared has reached the maximum number of times.

Optionally, after the version of the second skill is updated, when it comes to the next sharing, a sharing link of the updated version of the second skill needs to be regenerated, where the sharing links for different versions of the second skill are different.

In this embodiment, according to user's operation on the entry to the second skill, the management subpage of the second skill is opened, where the management subpage includes the identity of the second skill and the share button; the user's third click operation on the share button is received; a sharing link of the second skill is generated according to the third click operation; the sharing link of the second skill is copied according to the user operation. The copied sharing link of the second skill can be pasted in the instant messaging software, webpage, mail or file to share the second skill with other developers, thus rendering the sharing manner more diversified and flexible.

Figure 7:
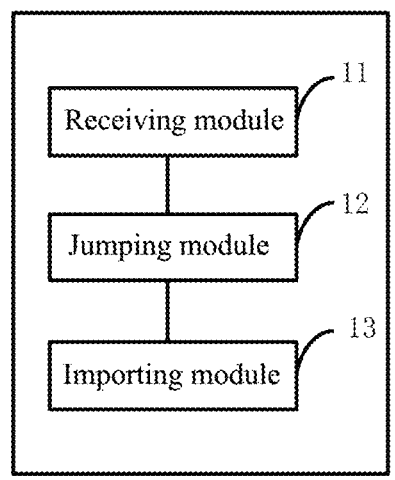
FIG. 7 is a schematic structural diagram of an apparatus for skill sharing provided by Embodiment 4 of the present disclosure.

FIG. 7 is a schematic structural diagram of an apparatus for skill sharing provided by Embodiment 4 of the present disclosure. As shown in FIG. 7, the apparatus of the present embodiment includes:

a receiving module 11, configured to receive a user's first click operation on a sharing link of a first skill;

a jumping module 12, configured to jump to a skill development page according to the first click operation, where the skill development page includes a input box of link and an import button, and the input box is used to input a sharing link of a skill, while the import button is used to input an import instruction of the skill; and an importing module 13, configured to import the first skill into a skill development platform according to a user operation.

Optionally, the importing module 13 is specifically configured to:

automatically paste the sharing link of the first skill to the input box;

receive the user's second click operation on the import button;

import the first skill into the skill development platform according to the second click operation.

Optionally, the importing module 13 is specifically configured to:

paste the sharing link of the first skill into the input box according to a paste operation input by the user;

alternatively, receive the sharing link of the first skill which is input by the user through an input component;

receive the user's second click operation on the import button; and import the first skill into the skill development platform according to the second click operation.

Optionally, the apparatus further includes:

an opening module, configured to open a resource management page according to a user operation, where the resource management page includes an intent, a dictionary and codes of the first skill.

Optionally, the apparatus further includes an updating module;

the receiving module is further configured to receive the user's editing operation on one or more of the intention, the dictionary, and the codes of the first skill;

the updating module, configured to generate an updated version of the first skill according to the editing operation.

Optionally, after the version of the first skill is updated, when it comes to the next sharing, a sharing link of the updated version of the first skill needs to be regenerated, where the sharing links for different versions of the first skill are different.

Optionally, the receiving module is further configured to:
receive the sharing link of the first skill sent by another user through instant messaging software.

Optionally, the sharing link of the first skill is shared within a webpage, a mail or a file.

The apparatus in the present embodiment may be used to perform the method in the Embodiment 1 or the Embodiment 2. As the specific implementations and the technical effects are similar, details are not described herein again.

Figure 8:
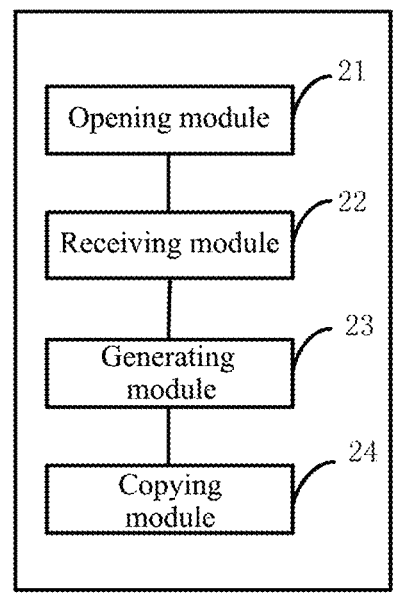
FIG. 8 is a schematic structural diagram of an apparatus for skill sharing provided by Embodiment 5 of the present disclosure.

FIG. 8 is a schematic structural diagram of an apparatus for skill sharing provided by Embodiment 5 of the present disclosure. As shown in FIG. 8, the apparatus of the present embodiment includes:

an opening module 21, configured to open a management subpage of a second skill according to the user's operation on a created entry to the second skill in the skill development page, where the management subpage includes an identity and a share button of the second skill;

a receiving module 22, configured to receive the user's third click operation on the share button;

a generating module 23, configured to generate a sharing link of the second skill according to the third click operation;

a copying module 24, configured to copy the sharing link of the second skill according to a user operation.

Optionally, the generating module 23 is specifically configured to:

generate a dialog box according to the third click operation, where the dialog box includes the sharing link of the second skill, and the dialog box further includes a copy button;

the copying module 24 is specifically configured to:

receive the user's fourth click operation on the copy button;

copy the sharing link of the second skill according to the fourth click operation.

Optionally, the dialog box further includes first prompt information, where the first prompt information is used to indicate a maximum number of times the second skill can be shared within a preset time.

Optionally, the apparatus further includes:

a determining module, configured to determine whether a number of times the second skill is shared is greater than the maximum number of times;

the generating module 23 is specifically configured to generate the sharing link of the second skill when the number of times the second skill is shared is not greater than the maximum number of times;

set the share button to be invalid, and display second prompt information when the number of times the second skill is shared is greater than the maximum number of times, where the second prompt information is used to indicate that the number of times the second skill is shared has reached the maximum number of times.

Optionally, after the version of the second skill is updated, when it comes to the next sharing, a sharing link of the updated version of the second skill needs to be regenerated, where the sharing links for different versions of the second skill are different.

The apparatus in the present embodiment may be used to perform the method in the Embodiment 3. As the specific implementations and the technical effects are similar, details are not described herein again.

Figure 9:
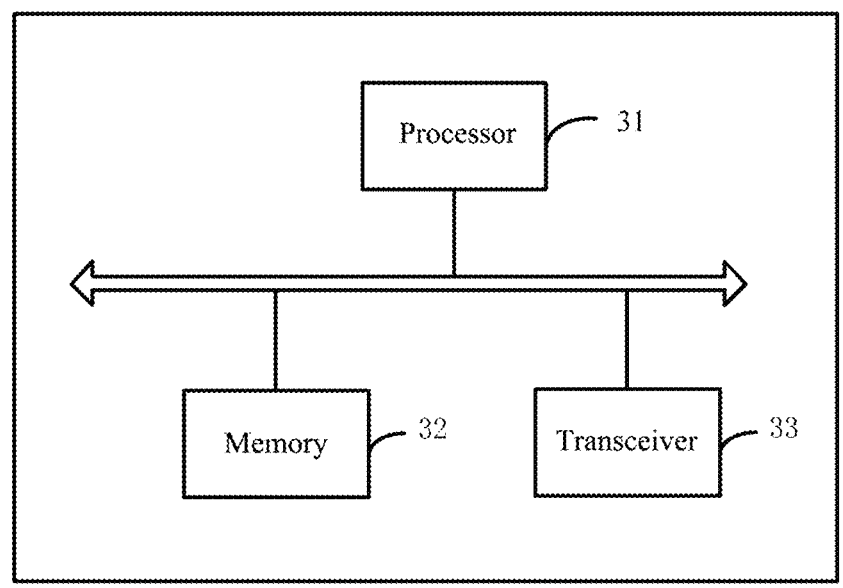
FIG. 9 is a schematic structural diagram of a terminal device provided by Embodiment 6 of the present disclosure.

FIG. 9 is a schematic structural diagram of a terminal device provided by Embodiment 6 of the present disclosure. As shown in FIG. 9, the terminal device 300 provided in this embodiment includes a processor 31, a memory 32, and a transceiver 33, where the memory 32 and the transceiver 33 are connected to and communicate with the processor 31 through a bus; the memory 32 is configured to store instructions; the transceiver 33 is configured to communicate with other devices; and the processor 31 is configured to execute instructions stored in the memory 32, so that the terminal device 300 performs the method according to any one of the Embodiment 1 to the Embodiment 3, and details are not described herein again.

The processor 31 may be a Microcontroller Unit (MCU), and the MCU is also called a Single Chip Microcomputer or a Single Chip Microcomputer; the processor 31 can also be a central processing unit (CPU), a digital signal processor (DSP), an application specific integrated circuit (ASIC), a field programmable gate array (FPGA) or other programmable logic devices, discrete gate or transistor logic device.

The memory 32 can be implemented by any type of volatile or non-volatile storage device or a combination thereof, such as Static Random-Access Memory (SRAM), Electrically Erasable Programmable read only memory (EEPROM), Erasable Programmable Read Only Memory (EPROM), Programmable Read-Only Memory (PROM), Read-Only Memory (ROM), magnetic memory, flash memory, disk or optical disk.

The transceiver 33 can establish a wired or wireless communication link with other devices, so that the smart device can access a wireless network based on the communication standard, such as WiFi, 2G or 3G, or a combination thereof. In an exemplary embodiment, the transceiver 33 further includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology and other technologies.

The bus may be an Industry Standard Architecture (ISA) bus, a Peripheral Component (PCI) bus, or an Extended Industry Standard Architecture (EISA) bus and the like. The bus can be classified into an address bus, a data bus, a control bus, etc. For ease of representation, the bus in the drawings of the present application is not limited to only one bus or one type of bus.

Embodiment 7 of the present disclosure provides a computer readable storage medium, where the computer readable storage medium stores instructions, and when executed, the instructions cause a computer to perform the method of any one of Embodiment 1 to Embodiment 3.

Finally, it should be noted that the above embodiments are only used to explain the technical solutions of the present application, and are not limited thereto; although the present application has been described in detail with reference to the foregoing embodiments, those skilled in the art should understand that the technical solutions described in the foregoing embodiments may be modified, or some or all of the technical features may be equivalently substituted; however, these modifications or substitutions do not make the essence of the technical solutions depart from the scopes of the embodiments of the present application.

What is claimed is:

1. A method for skill sharing, comprising:
receiving a user's first click operation on a sharing link of a first skill, wherein the sharing link of the first skill represents an address of a resource of the first skill;
jumping to a skill development page according to the first click operation, wherein the skill development page comprises an input box of a link and an import button, and the input box is used to input a sharing link of a skill, while the import button is used to input an import instruction of the skill; and importing the first skill into a skill development platform according to a user operation.

2. The method according to claim 1, wherein the importing the first skill into the skill development platform according to a user operation comprises:

automatically pasting the sharing link of the first skill to the input box;

receiving the user's second click operation on the import button; and importing the first skill into the skill development platform according to the second click operation.

3. The method according to claim 2, wherein after the importing the first skill into the skill development platform, the method further comprises:

opening a resource management page according to a user operation, wherein the resource management page comprises an intent, a dictionary and codes of the first skill;

receiving the user's editing operation on one or more of the intention, the dictionary, and the codes of the first skill; and generating an updated version of the first skill according to the editing operation.

4. The method according to claim 1, wherein the importing the first skill into the skill development platform according to a user operation comprises:

pasting the sharing link of the first skill into the input box according to a paste operation input by the user;

alternatively, receiving the sharing link of the first skill which is input by the user through a input component;

receiving the user's second click operation on the import button; and importing the first skill into the skill development platform according to the second click operation.

5. The method according to claim 1, wherein before the receiving a user's first click operation on a sharing link of a first skill, the method further comprises:

receiving the sharing link of the first skill sent by another user through instant messaging software.

6. The method according to claim 1, wherein the sharing link of the first skill is shared within a webpage, a mail or a file.

7. The method according to claim 1, wherein the method further comprises:

opening a management subpage of a second skill according to the user's operation on a created entry to the second skill in the skill development page, wherein the management subpage comprises an identity and a share button of the second skill;

receiving the user's third click operation on the share button;

generating a sharing link of the second skill according to the third click operation; and copying the sharing link of the second skill according to a user operation.

8. The method according to claim 7, wherein the generating a sharing link of the second skill according to the third click operation comprises:

generating a dialog box according to the third click operation, wherein the dialog box comprises the sharing link of the second skill, and the dialog box further comprises a copy button;

wherein the copying the sharing link of the second skill according to a user operation comprises:

receiving the user's fourth click operation on the copy button; and copying the sharing link of the second skill according to the fourth click operation.

9. The method according to claim 8, wherein the dialog box further comprises first prompt information, wherein the first prompt information is used to indicate a maximum number of times the second skill can be shared within a preset time;

before the opening a management subpage of a second skill, the method further comprises:

determining whether a number of times the second skill is shared is greater than the maximum number of times;

if the number of times the second skill is shared is not greater than the maximum number of times, generating the sharing link of the second skill; and if the number of times the second skill is shared is greater than the maximum number of times, setting the share button to be invalid, and displaying second prompt information, wherein the second prompt information is used to indicate that the number of times the second skill is shared has reached the maximum number of times.

10. An apparatus for sharing skill, comprising:

a processor, a memory and a transceiver, wherein the memory is configured to store instructions; the transceiver is configured to communicate with other devices; and when executed, the instructions cause the processor to:

receive a user's first click operation on a sharing link of a first skill, wherein the sharing link of the first skill represents an address of a resource of the first skill;

jump to a skill development page according to the first click operation, wherein the skill development page comprises an input box of a link and an import button, and the input box is used to input a sharing link of a skill, and the import button is used to input an import instruction of the skill; and import the first skill into a skill development platform according to a user operation.

11. The apparatus according to claim 10, wherein the instructions further cause the processor to:

automatically paste the sharing link of the first skill to the input box;

receive the user's second click operation on the import button; and import the first skill into the skill development platform according to the second click operation.

12. The apparatus according to claim 11, wherein the instructions further cause the processor to:

open a resource management page according to a user operation, wherein the resource management page comprises an intent, a dictionary and codes of the first skill;

receive the user's editing operation on one or more of the intention, the dictionary, and the codes of the first skill; and generate an updated version of the first skill according to the editing operation.

13. The apparatus according to claim 10, wherein the instructions further cause the processor to:

paste the sharing link of the first skill into the input box according to a paste operation input by the user;

alternatively, receive the sharing link of the first skill which is input by the user through a input component;

receive the user's second click operation on the import button; and import the first skill into the skill development platform according to the second click operation.

14. The apparatus according to claim 10, wherein the instructions further cause the processor to:
receive the sharing link of the first skill sent by another user through instant messaging software.

15. The apparatus according to claim 10, wherein the sharing link of the first skill is shared within a webpage, a mail or a file.

16. The apparatus according to claim 10, wherein the instructions further cause the processor to:
open a management subpage of a second skill according to the user's operation on a created entry to the second skill in the skill development page, wherein the management subpage comprises an identity and a share button of the second skill;
receive the user's third click operation on the share button;
generate a sharing link of the second skill according to the third click operation; and
copy the sharing link of the second skill according to a user operation.

17. The apparatus according to claim 16, wherein the instructions further cause the processor to:
generate a dialog box according to the third click operation, wherein the dialog box comprises the sharing link of the second skill, and the dialog box further comprises a copy button; and
receive the user's fourth click operation on the copy button; and
copy the sharing link of the second skill according to the fourth click operation.

18. The apparatus according to claim 17, wherein the dialog box further comprises first prompt information, wherein the first prompt information is used to indicate a maximum number of times the second skill can be shared within a preset time; and
the instructions further cause the processor to:
determine whether a number of times the second skill is shared is greater than the maximum number of times;
generate the sharing link of the second skill if the number of times the second skill is shared is not greater than the maximum number of times; and
set the share button to be invalid and display second prompt information if the number of times the second skill is shared is greater than the maximum number of times, wherein the second prompt information is used to indicate that the number of times the second skill is shared has reached the maximum number of times.

19. A non-transitory computer readable storage medium, wherein the computer readable storage medium stores instructions which, when executed, cause a computer to perform the following steps:
receiving a user's first click operation on a sharing link of a first skill, wherein the sharing link of the first skill represents an address of a resource of the first skill;
jumping to a skill development page according to the first click operation, wherein the skill development page comprises an input box of a link and an import button, and the input box is used to input a sharing link of a skill, while the import button is used to input an import instruction of the skill; and
importing the first skill into a skill development platform according to a user operation.

* * * * *